Dec. 6, 1932.   G. A. GAVARD   1,889,983
STONE SAW
Filed Sept. 20, 1929

INVENTOR
George A Gavard
BY
F. P. Gorin
ATTORNEY

Patented Dec. 6, 1932

1,889,983

UNITED STATES PATENT OFFICE

GEORGE A. GAVARD, OF INDEX, WASHINGTON, ASSIGNOR, BY DIRECT AND MESNE ASSIGNMENTS, TO GAVARD STONE SAW COMPANY, A CORPORATION OF WASHINGTON

STONE SAW

Application filed September 20, 1929. Serial No. 394,043.

This invention relates to improvements in saws and more particularly to saws designed for cutting stone and particularly granite.

It has been customary in the art to use saws for this purpose which have teeth spaced apart from each other so as to allow the feeding of steel shot which deposit themselves within the spaces between the teeth so as to produce the sawing or cutting operation. The difficulty heretofore has been that, while saws of such general construction effectively cut the stone, yet when the teeth are worn down to the edge of the saw blank itself, no proper feeding of the shot could continue because there would be no place for lodgment of them. These saw teeth usually project about nine and one-half inches beyond the periphery of the saw blank or disc, and heretofore the forward edge of each tooth has been provided with a pocket to hold the shot after the teeth have been worn down about to the pockets, or somewhat below. In this case, of course, the pockets would hold such a small number of the shot that the sawing operation would have to be discontinued until new teeth were affixed to the saw proper. This replacement of the teeth involved a waste of sheet steel of about one and one-half inches, besides causing the sawing operation to be much shorter than it would have been if enough shot could still be availed of after the teeth had worn down to the pockets in them.

The object of this invention is to provide teeth which will hold the shot and wear down to the saw body.

A further object is to provide a saw having detachable teeth connected thereto, said saw having notches cut between the teeth to provide holders for the shot.

The invention is illustrated in the accompanying drawing, in which.

Figure 2:
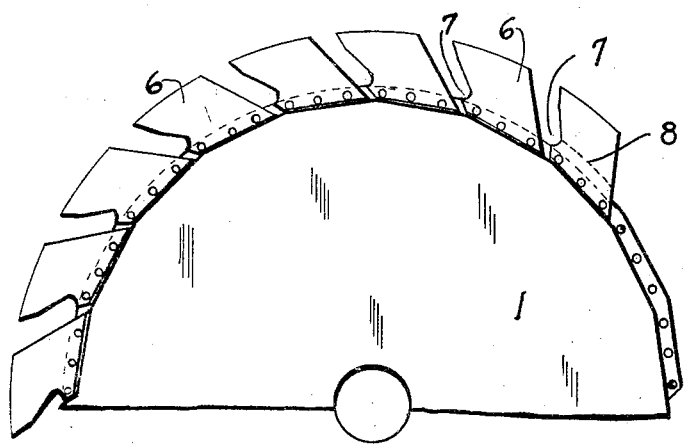
Figure 2 is a similar view showing the teeth heretofore known in the art.

Referring now more particularly to the drawing, reference numeral 1 indicates the blank or saw proper. 2 indicates my improved teeth, which are grooved as at 3, and into which fits a tongue 4 projecting from the blank 1.

The teeth are put into position as plainly shown in the drawing, and riveted to the blank by means of rivets 5. Heretofore teeth 6 have been used, as shown in Figure 2, which are secured to the blank in the manner already described, and which have recesses 7 in the teeth themselves.

Figure 1:
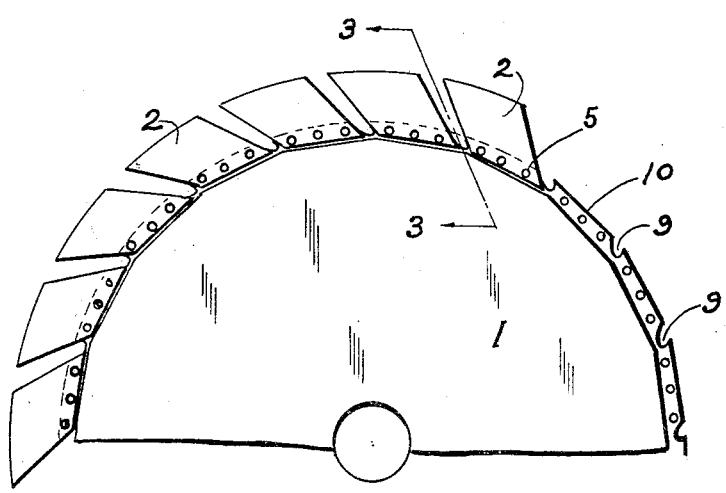
Figure 1 is a fragmentary plan view of a saw equipped with my improved teeth.
Figure 3:
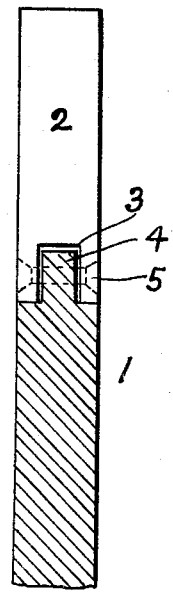
Figure 3 is a sectional view taken upon the line 3—3 of Figure 1.

The teeth 6 have been spaced apart as shown so as to allow steel shot or the like to be fed into the spaces between the teeth, and as the saw is rotated, the stone is cut or sawed. Heretofore the teeth 6, when worn down to about the dotted line 8 in Figure 2, became practically useless because the recesses 7 did not contain enough shot to do any efficient cutting or sawing. The result of this was that when the teeth 6 had become worn to the line indicated, they had to be removed and new teeth put in their places, resulting in a waste of labor, time, and material. In my improved teeth, as shown in Figure 1, the blank itself is recessed, as at 9, so that the sawing operation can continue until the teeth wear down to the line indicated at 10. The reason for this, of course, is that the shot will fill up the recesses 7.

What is claimed to be new is:

1. A rotary saw comprising a substantially circular blank, a reduced tongue projecting from the periphery of said blank and provided with notches of less depth than the tongue and arranged at spaced intervals, the walls of said notches being bound by two intersecting, non-radial lines, teeth, each of which is formed at its inner end with a groove to fit over the tongue between said notches, and means for securing the teeth to the tongue, the width of each tooth at the base equalling the distance between the forward edge wall of one notch and the rear edge wall of the next succeeding notch.

2. A rotary saw comprising a substantially circular blank, a reduced tongue projecting from the periphery of said blank, a plurality of peripherally spaced notches formed in said tongue, the walls of said notches being bound by two intersecting, non-radial lines, the teeth having inclined side edges, each tooth being formed at its inner end with a groove to fit over the tongue between said notches, and means for securing the teeth to the tongue, the adjacent teeth being so positioned on said blade as to form a shot-receiving channel which is in alignment with a notch in the tongue.

In testimony whereof I affix my signature.

GEORGE A. GAVARD.